US012509933B2

(12) United States Patent
Kurihara

(10) Patent No.: US 12,509,933 B2
(45) Date of Patent: Dec. 30, 2025

(54) DAMPER DEVICE

(71) Applicant: PIOLAX, INC., Kanagawa (JP)

(72) Inventor: Shogo Kurihara, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 0 days.

(21) Appl. No.: 18/805,562

(22) Filed: Aug. 15, 2024

(65) Prior Publication Data

US 2025/0067106 A1 Feb. 27, 2025

(30) Foreign Application Priority Data

Aug. 22, 2023 (JP) ................. 2023-134526

(51) Int. Cl.
*E05F 3/02* (2006.01)

(52) U.S. Cl.
CPC ............ *E05F 3/02* (2013.01); *E05Y 2201/21* (2013.01); *E05Y 2201/234* (2013.01); *E05Y 2201/41* (2013.01)

(58) Field of Classification Search
CPC .......... E05F 3/02; E05F 3/00; E05Y 2201/21; E05Y 2201/212; E05Y 2201/234; E05Y 2201/41; E05Y 2201/422; E05Y 2201/424; E05Y 16/281; E05Y 16/284–286; E05Y 16/82; E05Y 16/84; E05Y 16/85
See application file for complete search history.

(56) References Cited

U.S. PATENT DOCUMENTS

| 5,333,845 | A | * | 8/1994 | Seiichi | F16F 13/00 267/71 |
| 5,845,749 | A | * | 12/1998 | Moretz | F16F 9/362 267/64.11 |
| 6,367,785 | B1 | * | 4/2002 | Nakabayashi | F16F 9/54 267/71 |
| 6,578,833 | B2 | * | 6/2003 | Arisaka | B60R 5/044 267/71 |
| 6,669,178 | B2 | * | 12/2003 | Ookawara | F16F 9/02 267/71 |
| 7,367,086 | B2 | * | 5/2008 | Ito | E05F 3/02 267/221 |
| 8,827,056 | B2 | * | 9/2014 | Koizumi | F16F 9/3415 188/289 |
| 2001/0007164 | A1 | * | 7/2001 | Arisaka | F16F 9/0209 16/84 |

FOREIGN PATENT DOCUMENTS

| EP | 1114945 A2 * | 7/2001 | ............... F16F 9/54 |
| JP | 5856678 B2 | 2/2016 | |

* cited by examiner

*Primary Examiner* — Chuck Y Mah

(74) *Attorney, Agent, or Firm* — Paratus Law Group, PLLC

(57) ABSTRACT

A damper device includes: a cylinder having a vent hole and a valve seat; and a piston. An elastically deformable valve body abuts against the valve seat before and when the piston moves in a damper braking direction. The valve seat is formed with a vent groove. A protrusion amount of an inclined surface gradually decreases from a side of an outer periphery of the valve seat toward the vent hole. The vent groove includes a first groove that extends from an outer periphery of the inclined surface toward the vent hole such that a depth thereof with respect to the inclined surface gradually decreases. When the piston moves in the damper braking direction, the valve body comes into contact with the inclined surface and is elastically deformed, and a contact area with the inclined surface widens.

4 Claims, 13 Drawing Sheets

DAMPER DEVICE

CROSS-REFERENCE TO RELATED APPLICATIONS

This application is based on and claims priority under 35 USC § 119 from Japanese Patent Application No. 2023-134526 filed on Aug. 22, 2023, the contents of which are incorporated herein by reference.

TECHNICAL FIELD

The present invention relates to a damper device used to brake opening, closing, and the like of a glove box of an automobile.

BACKGROUND

A damper device may be used in, for example, a glove box of an automobile to suppress a lid from being rapidly opened and allow the lid to be gently opened.

As a damper device to be described below, a following Patent Literature 1 discloses a damper that includes a piston, a cylinder having a partition wall formed with a vent hole, and a valve body. The cylinder includes a first tube portion, which surrounds the vent hole and protrudes in a tubular shape from the partition wall of the cylinder and has a top end serving as an opening communicating with the vent hole, and a second tube portion, which surrounds the first tube portion and protrudes in a tubular shape from the partition wall of the cylinder. The second tube portion includes a plurality of protruding portions formed on an inner peripheral surface in a circumferential direction. The valve body is freely fitted between the plurality of protruding portions and the top end of the first tube portion.

The opening at the top end of the first tube portion is formed with a groove that has a fine width and functions as an orifice. When the piston slides in a direction away from the partition wall, the valve body abuts against the top end of the first tube portion and closes the vent hole, so that negative pressure occurs in a first chamber in the cylinder and a damping force (braking force) is generated. At this time, the damping force is adjusted by air flowing through the groove.

In the damper of Patent Literature 1 as described in paragraph 0020, as the negative pressure of the first chamber in the cylinder increases, the valve body enters the groove, an opening of the orifice is narrowed, and a larger damping force is generated.

Patent Literature 1: JP5856678B

The damper device may require responsiveness (referred to as load responsiveness or responsiveness according to a speed of the piston) according to a load of an item or the like, so that, for example, a large braking force is applied when the item or the like accommodated in the glove box have a large weight (load) and a braking force smaller than that when the item or the like have a large weight is applied when the item or the like have a small weight.

In the damper of Patent Literature 1, as described above, an opening area of the groove having a fine width is adjusted by the valve body entering the groove. However, the load responsiveness as described above cannot be said good since the valve body is difficult to enter the groove due to the fine width.

An object of the present invention is to provide a damper device having good load responsiveness.

SUMMARY

There is provided a damper device configured to be attached between a pair of members that are configured to approach and separate from each other, and applying a braking force when the pair of members approach or separate from each other. The damper device includes: a cylinder having a cylindrical shape having an internal space, an opening at one end portion, and a vent hole and a valve seat at another end portion, the vent hole communicating with the internal space; and a piston configured to reciprocate in the cylinder. An elastically deformable valve body is provided at the other end portion of the cylinder and abuts against the valve seat before and when the piston moves in a damper braking direction, and at least a part of the valve body separates from the valve seat when the piston moves in a return direction opposite to the damper braking direction. The valve seat surrounds the vent hole and protrudes in a direction opposite to the internal space, and is formed with a vent groove that extends from an outer periphery of the valve seat toward the vent hole and communicates with the vent hole. A part of the valve seat that faces the valve body is configured to serve as an inclined surface whose protrusion amount gradually decreases from a side of the outer periphery of the valve seat toward the vent hole. The vent groove includes a first groove that extends from an outer periphery of the inclined surface toward the vent hole such that a depth thereof with respect to the inclined surface gradually decreases. When the piston moves in the damper braking direction, the valve body comes into contact with the inclined surface and is elastically deformed along the inclined surface, and a contact area with the inclined surface widens.

DESCRIPTION OF EMBODIMENTS

First Embodiment of Damper Device

Hereinafter, a damper device according to an embodiment of the present invention will be described with reference to the drawings.

Figure 1:
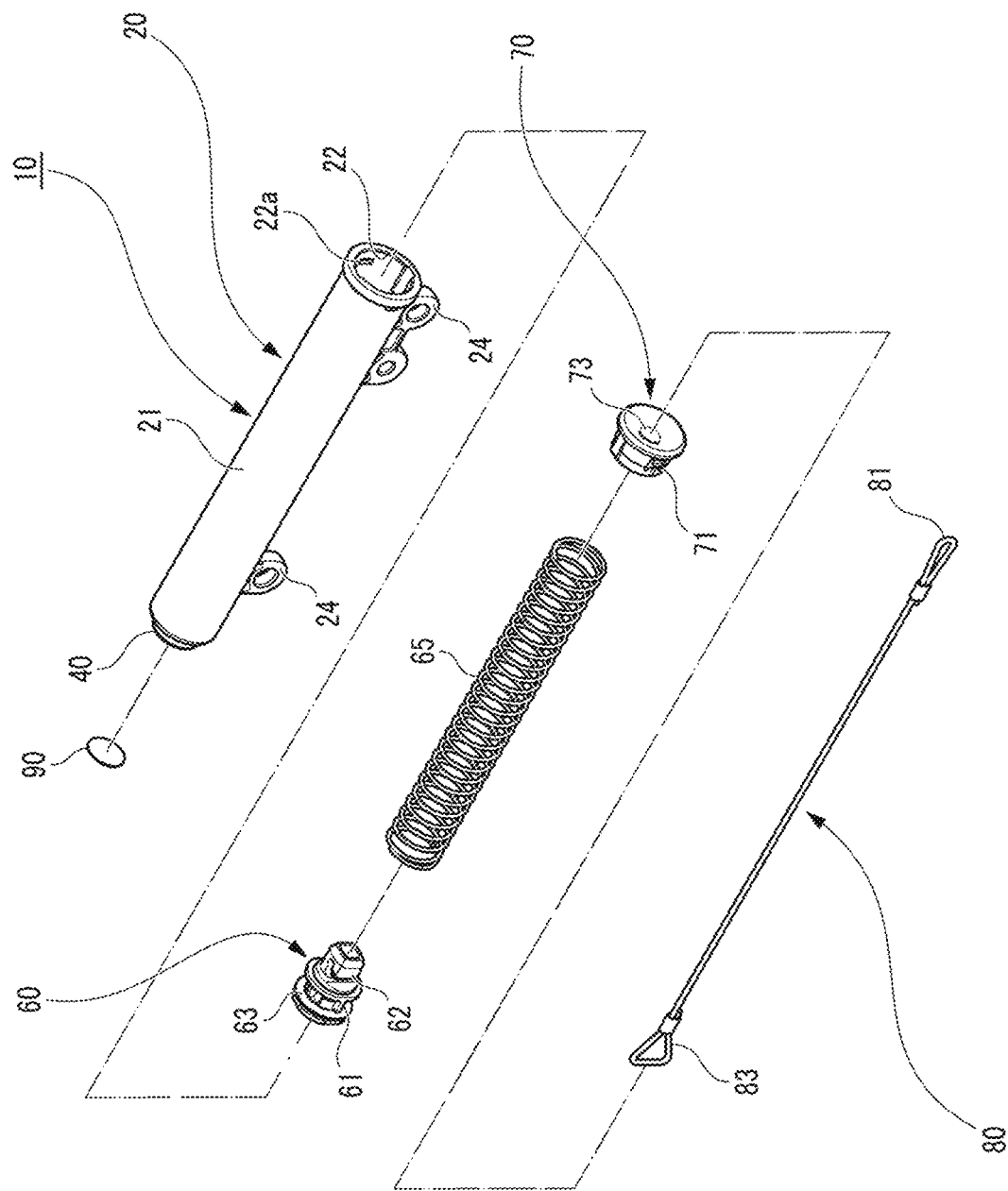
FIG. 1 is an exploded perspective view illustrating a damper device according to an embodiment of the present invention.
Figure 2:
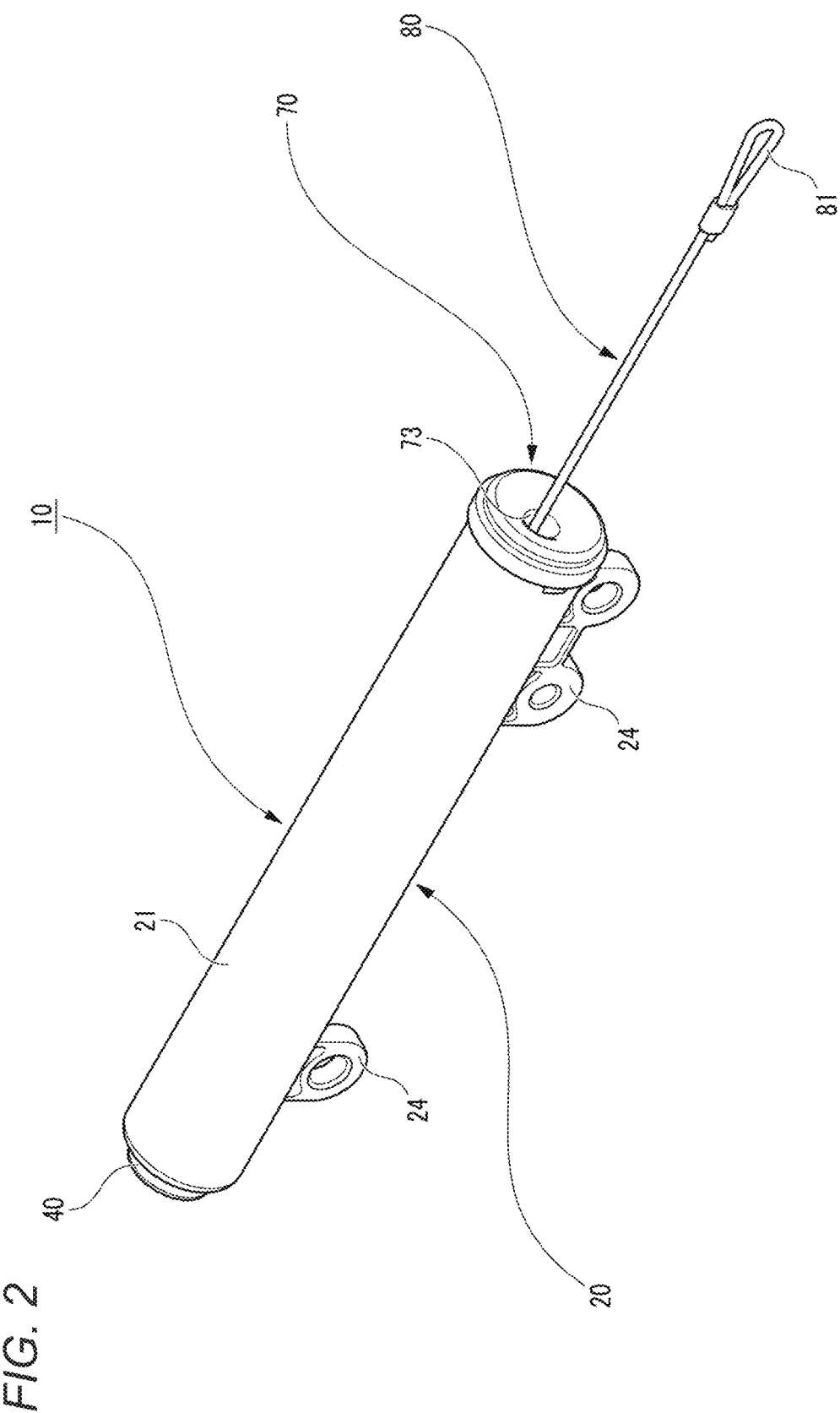
FIG. 2 is a perspective view of the damper device.

A damper device 10 illustrated in FIGS. 1 and 2 is attached to a pair of members that approach and separate from each other, and applies a braking force when the pair of members approach or separate from each other. For example, the damper device 10 can be used to brake a glove box, a lid, or the like that is attached to an opening of an accommodation portion in an instrument panel of an automobile in a manner of being openable and closable. In the following embodiment, one of the pair of members is described as a fixed body such as the accommodation portion of the instrument panel, and the other of the pair of members is described as an openable and closable body such as the glove box or the lid attached to the opening of the fixed body in a manner of being openable and closable.

Figure 3:
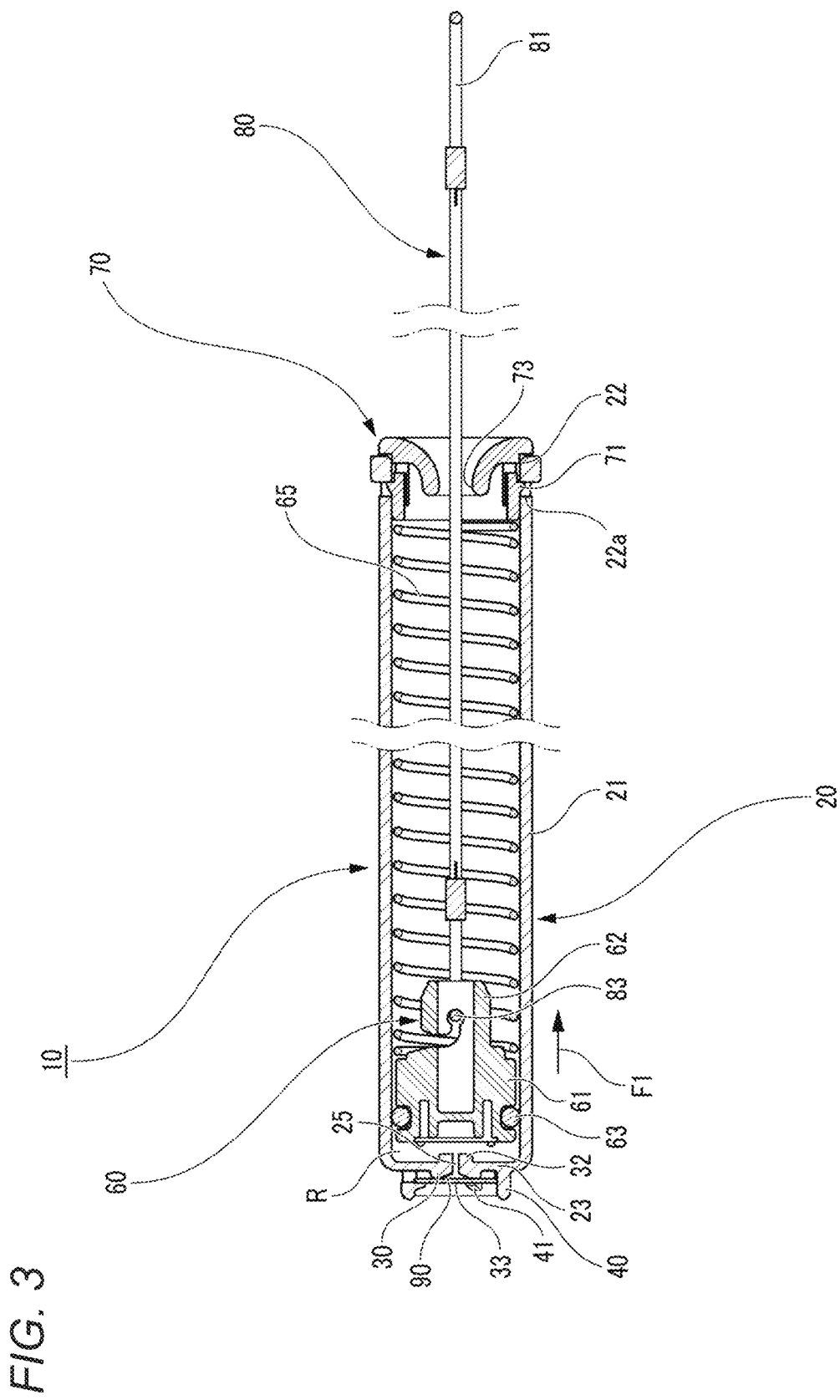
FIG. 3 is a sectional view of the damper device.

As illustrated in FIGS. 1 to 3, the damper device 10 according to the present embodiment has a cylindrical shape having an internal space R, and includes a cylinder 20 provided with an opening 22 in one end portion and a vent hole 25, which communicates with the internal space R, and a valve seat 30 at the other end portion, a piston 60 that reciprocates in the cylinder 20, a coil spring 65 constituting a piston urging portion that urges the piston 60 in the cylinder 20, a cap 70 attached to the opening 22 of the cylinder 20, and a string-shaped body 80 locked to the piston 60.

On a side of the other end portion of the cylinder 20 that is opposite to the internal space R, an elastically deformable valve body 90 is provided, which abuts against the valve seat 30 before and when the piston 60 moves in a damper braking direction, and at least a part of which separates from the valve seat 30 when the piston 60 moves in a return direction opposite to the damper braking direction. It is needless to say that the valve body may be elastically deformable such that the entire valve body separates from the valve seat when the piston moves in the return direction.

The valve body 90 in the present embodiment is formed of an elastic material such as rubber, and is an elastically deformable member as described above that has a circular plate shape.

It can also be said that the valve body 90 is disposed on the side of the other end portion of the cylinder 20 that is opposite to the internal space R, abuts against the valve seat 30 and generates a damper braking force before and when the piston 60 moves in the damper braking direction, and at least a part thereof separates from the valve seat 30 and releases the damper braking force when the piston 60 moves in the return direction opposite to the damper braking direction.

The cylinder 20 includes a substantially cylindrical wall portion 21, the opening 22 in one end portion in an extending direction, and an end wall 23 (see FIG. 3) at the other end in the extending direction. A plurality of locking holes 22*a* are formed in a vicinity of the opening 22 in the one end portion of the wall portion 21.

In the following description, "one end portion" or "one end" refers to one end portion or one end of the damper device 10 on a damper braking direction side, and "the other end portion" or "the other end" refers the other end portion or the other end on a return direction side opposite to the damper braking direction side.

Further, the "damper braking direction" in the present embodiment refers to a direction in which the piston 60 separates from the end wall 23 (see FIG. 3) of the cylinder 20 and an amount of the string-shaped body 80 pulled out from the opening 22 of the cylinder 20 increases (see an arrow F1 in FIG. 3).

Figure 7:
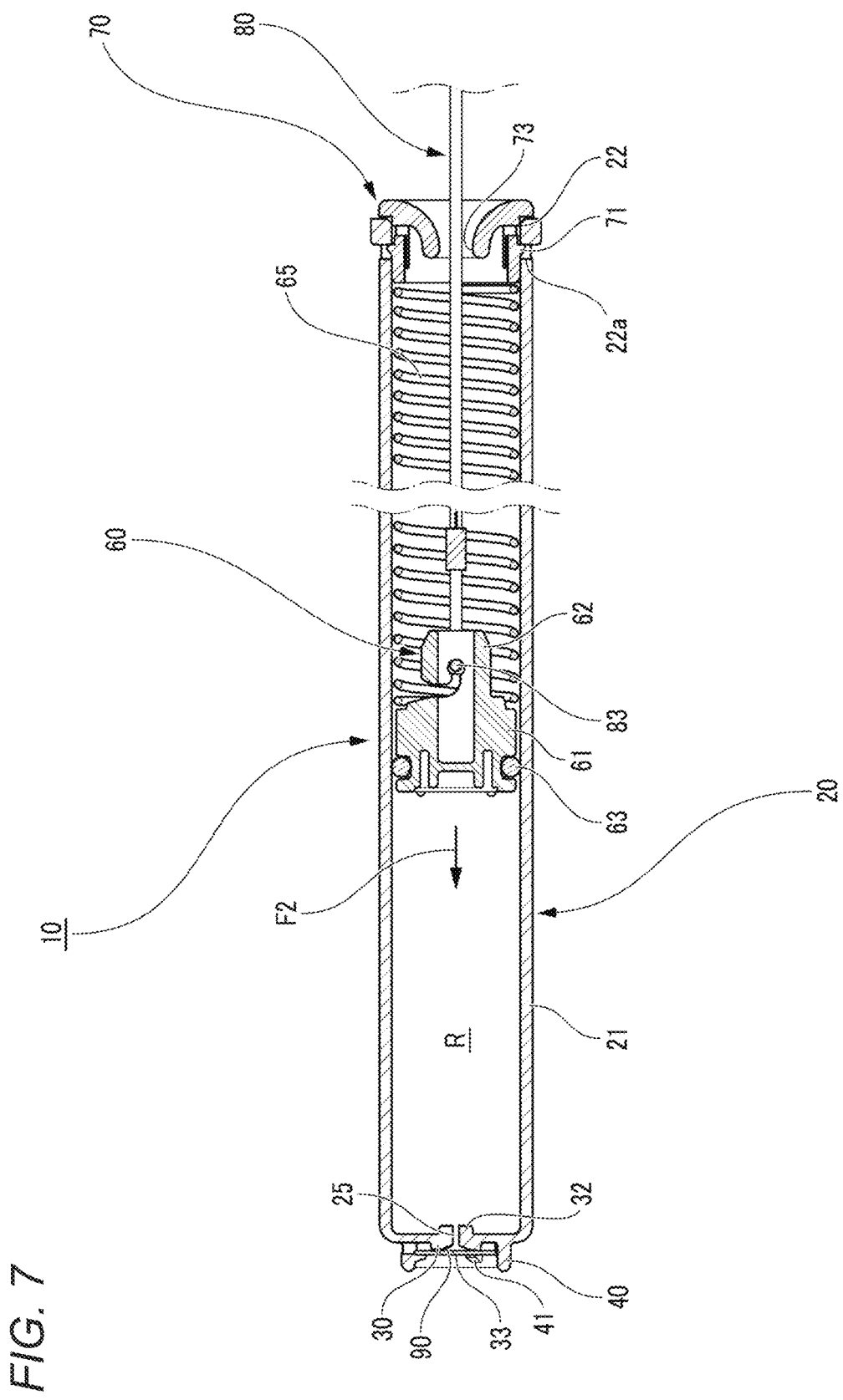
FIG. 7 is a sectional view of the damper device in a state in which a piston moves from a state in FIG. 3 and a damper braking force is generated.

In addition, the "return direction opposite to the damper braking direction" (hereinafter, also simply referred to as "damper return direction") in the present embodiment refers to a direction in which the piston 60 approaches the end wall 23 of the cylinder 20 and the amount of the string-shaped body 80 pulled into the cylinder 20 increases (see an arrow F2 in FIG. 7).

The string-shaped body 80 has a string shape extending by a predetermined length, and both end portions 81 and 83 in an extending direction have an annular shape. The one end portion 81 in the extending direction is engaged with an engagement portion of an openable and closable body (not illustrated), and the other end portion 83 in the extending direction is locked to the piston 60.

The piston 60 includes a base portion 61 and a top end portion 62 coupled to the base portion 61. The base portion 61 is provided with, in a predetermined position of an outer periphery thereof, a seal ring 63 that is in sliding contact with an inner periphery of the wall portion 21 of the cylinder 20 and defines an air chamber in the cylinder 20. The other end portion 83 of the string-shaped body 80 is locked to the top end portion 62 (see FIG. 3).

The cap 70 is formed with a plurality of locking protrusions 71 on an outer periphery thereof. The cap 70 is attached to the opening 22 by the locking protrusions 71 being locked to the corresponding locking holes 22*a* of the cylinder 20. The cap 70 is further formed with a string pulling hole 73 in a radially central portion thereof, through which the string-shaped body 80 is pulled out.

As illustrated in FIG. 3, the coil spring 65 is disposed in a compressed state between the piston 60 and the cap 70 in the cylinder 20, which urges the piston 60 toward the end wall 23 of the cylinder 20.

Next, the cylinder 20 will be described in detail with reference to FIGS. 3 to 9 and the like.

The wall portion 21 constituting the cylinder 20 is provided with a plurality of attachment portions 24 from an outer periphery thereof. The cylinder 20 is attached to a fixed side (not illustrated) via the attachment portions 24.

The end wall 23 disposed at the other end portion of the wall portion 21 in the extending direction has a substantially circular plate shape. The circular vent hole 25 in the radially central portion of the end wall 23 extends along the extending direction of the cylinder 20 (see FIGS. 3, 4, and 6). The vent hole 25 is aligned with an axial center of the cylinder 20 (radial center of the wall portion 21).

Figure 6:
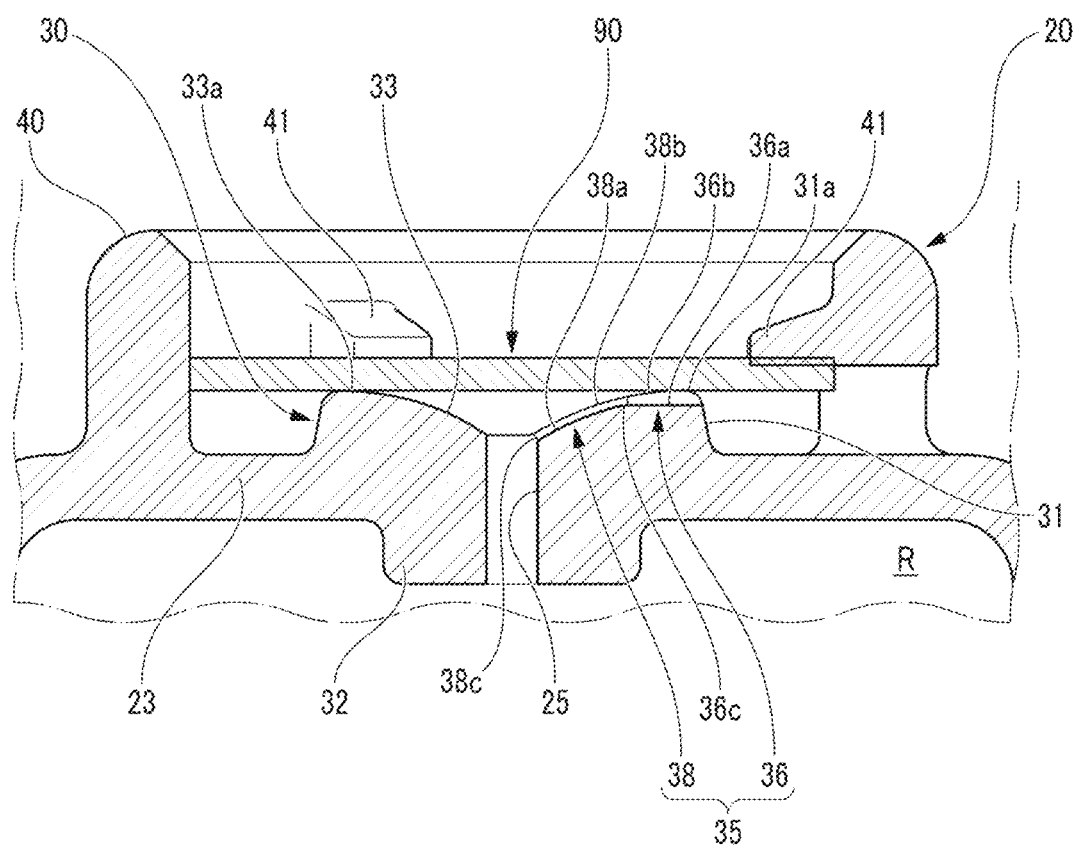
FIG. 6 is a sectional view taken along a line A-A in FIG. 5.

As illustrated in FIG. 6, the valve seat 30 surrounds the vent hole 25 and protrudes in a direction opposite to the internal space R, and is formed with a vent groove 35 that extends from an outer periphery 31 of the valve seat 30 toward the vent hole 25 and communicates with the vent hole 25.

Figure 4:
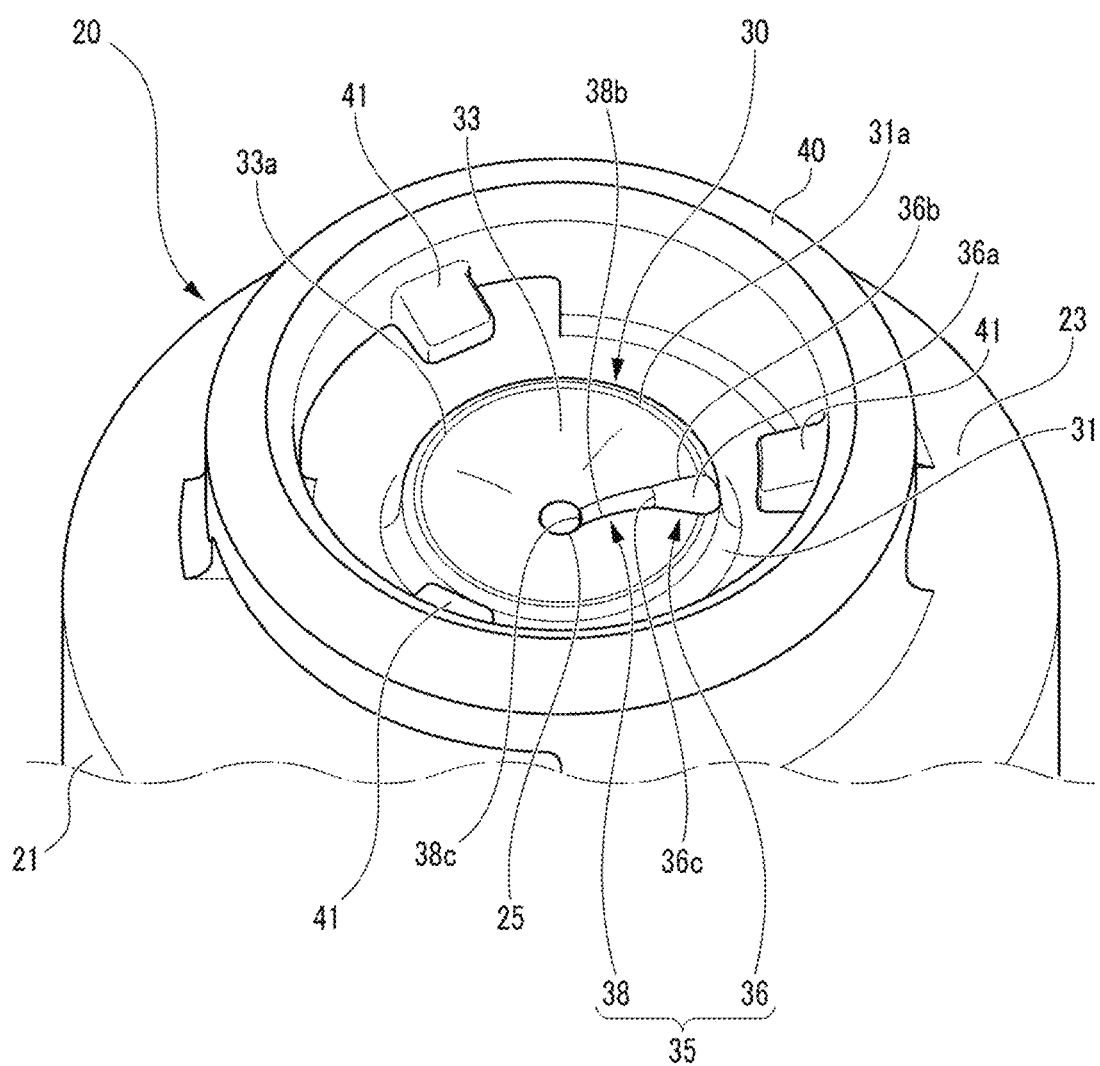
FIG. 4 is an enlarged perspective view of a main portion of the damper device.

Further, as illustrated in FIGS. 4, 6, and the like, a part of the valve seat 30 that faces the valve body 90 constitutes an inclined surface 33 in which a protrusion amount (protrusion amount of the valve seat 30 from the end wall 23) gradually decreases from the outer periphery 31 of the valve seat 30 toward the vent hole 25. It can also be said that the inclined surface 33 has such a shape that a depth (depth from a top end in the protruding direction of the valve seat 30) gradually increases from the outer periphery 31 of the valve seat 30 toward the vent hole 25. Since the inclined surface 33 of the valve seat 30 is a part with which the valve body 90 comes into contact to close the vent hole 25, it can be said that the inclined surface 33 is a seating surface of the valve seat 30.

The vent groove 35 includes a first groove 36 extending from an outer periphery of the inclined surface 33 (here, an outer peripheral edge portion 33a located on the outer periphery of the inclined surface 33, that is, a part reaching a top end edge portion 31a of the outer periphery 31 of the valve seat 30) toward the vent hole 25 such that a depth with respect to the inclined surface 33 gradually decreases.

Figure 8:
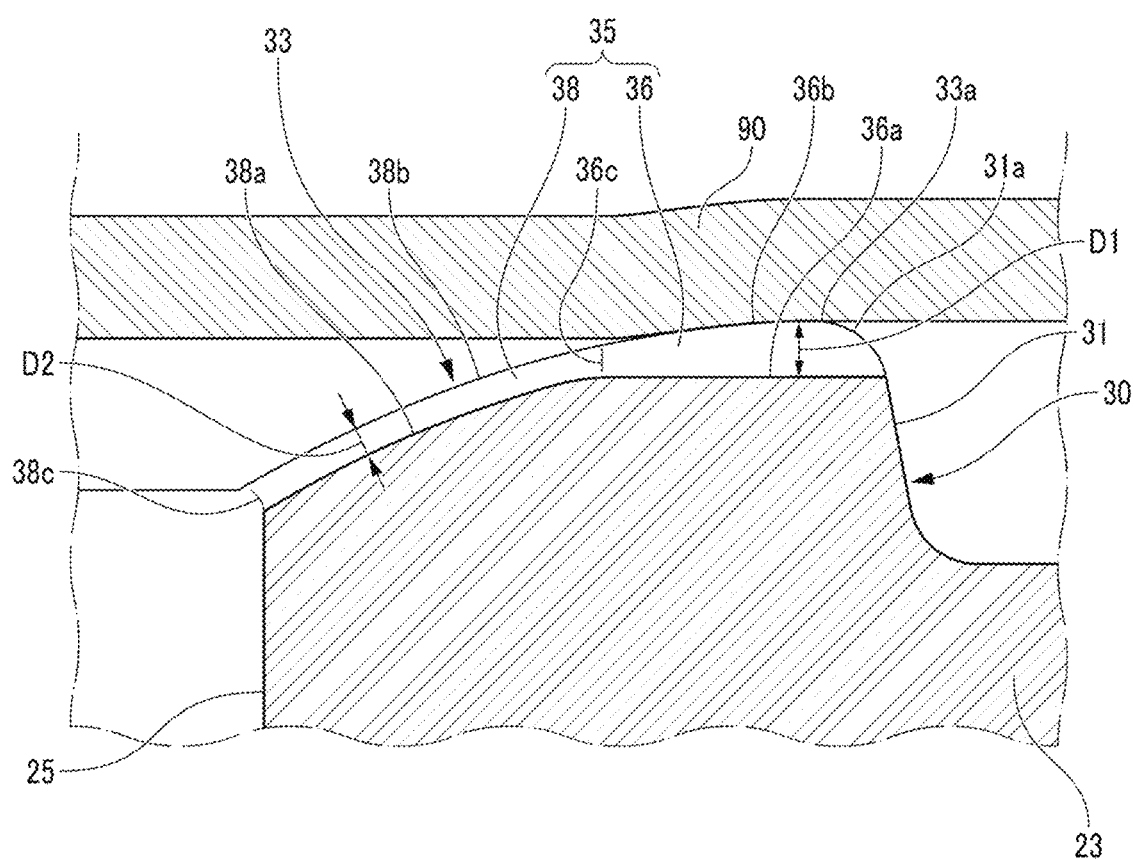
FIG. 8 is an enlarged sectional view of the damper device illustrating a deformed state of a valve body when the piston moves in a damper braking direction.
Figure 9:
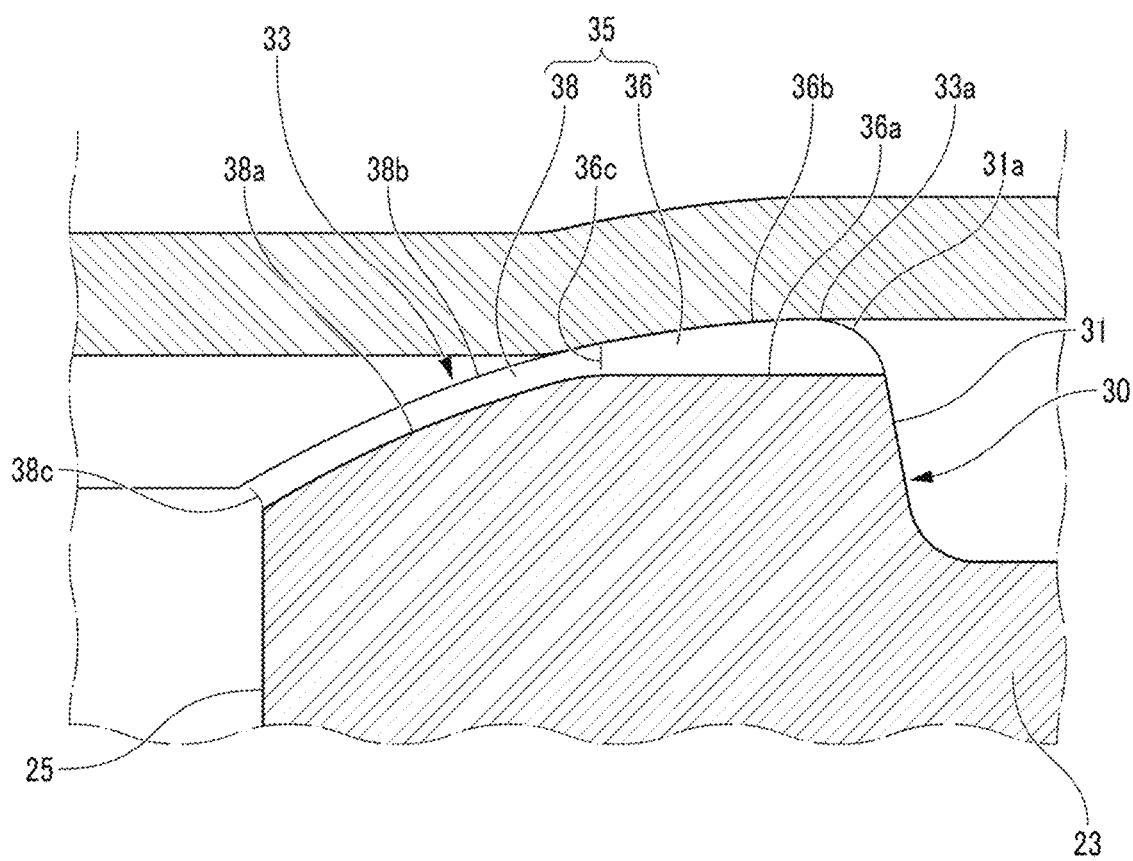
FIG. 9 is an enlarged sectional view of the damper device when a load is larger than a load in FIG. 8, illustrating the deformed state of the valve body when the piston moves in the damper braking direction.

The first groove 36 has a first opening 36b that opens toward the part facing the valve body 90, and a second opening 36c that is located on a top end side of the first groove 36 in an extending direction thereof and opens toward the vent hole 25 (see FIGS. 6, 8, and 9).

The vent groove 35 further includes a second groove 38 extending from the first groove 36 (here, the second opening 36c of the first groove 36) toward the vent hole 25 such that a depth with respect to the inclined surface 33 is constant (see FIGS. 6, 8, and 9). An internal space of the second groove 38 and an internal space of the first groove 36 communicate with each other through the second opening 36c.

When the piston 60 moves in the damper braking direction, the valve body 90 comes into contact with the inclined surface 33 and is elastically deformed along the inclined surface 33, and a contact area with the inclined surface 33 widens compared to before the piston 60 moves in the damper braking direction (FIGS. 8 and 9).

Regarding the valve seat 30 and the vent groove 35 more specifically, in the present embodiment, the valve seat 30 protrudes from an outer surface (surface opposite to an inner surface facing the internal space R) of the end wall 23 of the cylinder 20 in a direction opposite to the internal space R (direction away from the internal space R).

As illustrated in FIG. 6, the valve seat 30 has a substantially circular protruding shape having the circular outer periphery 31 whose diameter gradually decreases from a base end in the protruding direction toward the top end in the protruding direction. As illustrated in FIG. 4, the top end edge portion 31a of the outer periphery 31, which is farthest from the end wall 23 (protrusion amount from the end wall 23 is largest), has a rounded curved surface shape.

As illustrated in FIGS. 3 and 6, a protruding portion 32 having a circular protruding shape protrudes from a radially central portion of the inner surface of the end wall 23 that is aligned with the valve seat 30. The protruding portion 32 also surrounds the vent hole 25. That is, the vent hole 25 penetrates the valve seat 30 as well as the protruding portion 32.

As illustrated in FIGS. 6, 8, 9, and the like, the inclined surface 33 of the valve seat 30 has a curved surface shape (rounded curved surface shape) protruding in the protruding direction of the valve seat 30.

More specifically, the inclined surface 33, which is a part of the valve seat 30 that faces the valve body 90, is an inclined surface having a convex curved surface shape that draws a convex curved surface (convex curved surface protruding upward) protruding in the protruding direction of the valve seat 30 from the top end edge portion 31a of the outer periphery 31 of the valve seat 30 in the protruding direction toward the vent hole 25, in which the protrusion amount of the valve seat 30 from the outer surface of the end wall 23 gradually decreases (which can also be said that the depth from the top end edge portion 31a of the outer periphery 31 gradually increases).

As described above, the vent groove 35 includes the first groove 36 and the second groove 38. The first groove 36 has a base end in the extending direction located at the outer periphery 31 of the valve seat 30, communicates with outside of the valve seat, and extends from the outer peripheral edge portion 33a (peripheral edge portion located on a radially outer side of the inclined surface 33) of the inclined surface 33 toward the vent hole 25. The outer peripheral edge portion 33a of the inclined surface 33 reaches the top end edge portion 31a of the outer periphery 31 of the valve seat 30 (see FIGS. 4 and 5).

That is, the vent groove 35 communicates with the outer periphery of the valve seat 30 and the vent hole 25 from the outer periphery 31 of the valve seat 30 toward the vent hole 25 through the internal space of the first groove 36, the first opening 36b of the first groove 36, the second opening 36c, the internal space of the second groove 38, and a first opening 38b of the second groove 38, and a second opening 38c.

Further, when viewed from an axial direction of the vent hole 25, the first groove 36 constituting the vent groove 35 has a shape extending to be gradually narrower from the outer periphery (here, the outer peripheral edge portion 33a located on the outer periphery of the inclined surface 33) of the inclined surface 33 toward the vent hole 25. In the present embodiment, as illustrated in FIG. 5, the first groove 36 is wider on a base end side in the extending direction (outer periphery 31 side of the valve seat 30), gradually narrower toward the vent hole 25, and narrowest on the top end side in the extending direction.

Figure 5:
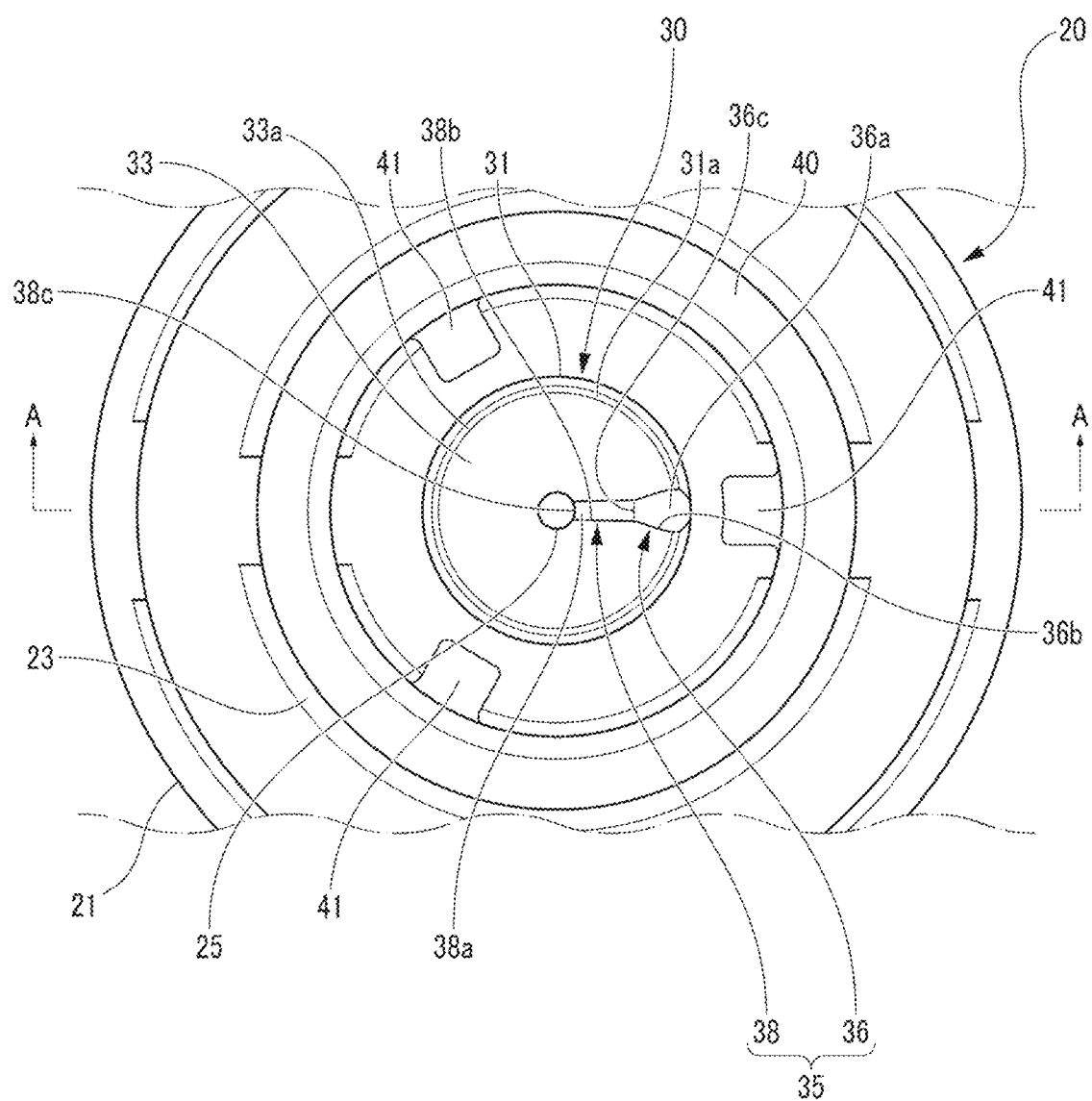
FIG. 5 is an enlarged plan view of a main portion of the damper device.

As illustrated in FIG. 5, the second groove 38 constituting the vent groove 35 has a substantially constant width from a base end in the extending direction thereof to the second opening 38c at the top end in the extending direction.

As illustrated in FIG. 8, a bottom portion 36a of the first groove 36 is perpendicular to an axial direction of the cylinder 20 (parallel to a direction perpendicular to the axial direction). The first opening 36b of the first groove 36 faces the bottom portion 36a.

As illustrated in FIG. 8, when the depth (length from the inclined surface 33 to the bottom portion 36a) of the first groove 36 with respect to the inclined surface 33 is D1, the depth D1 is set to be largest at the base end of the first groove 36 in the extending direction and gradually decrease toward the top end in the extending direction located on a vent hole 25 side.

The second groove 38 extending from the second opening 36c of the first groove 36 toward the vent hole 25 has the first opening 38b that opens toward the part facing the valve body 90, and the second opening 38c that is located on a top end side of the second groove 38 in the extending direction and communicates with the vent hole 25 (see FIGS. 6, 8, and 9).

Further, when the depth (length from the inclined surface 33 to a bottom portion 38a) of the second groove 38 with respect to the inclined surface 33 is D2, the depth D2 is set to be a constant depth (constant length) from a base end of the second groove 38 in the extending direction to a top end in the extending direction that communicates with the vent hole 25. The first opening 38*b* of the second groove 38 faces the bottom portion 38*a*.

In the present embodiment, when the piston 60 moves in the damper braking direction, the valve body 90 comes into contact with the inclined surface 33, is elastically deformed along the inclined surface 33 in a manner of expanding in a circumferential direction and falling inward in the radial direction of the inclined surface 33, and the contact area with the inclined surface 33 widens. Accordingly, an elastic deformation amount of the valve body 90 changes according to a load of an article that is applied to the one or the other member.

Further, in the present embodiment, as a result of the valve body 90 coming into contact with the inclined surface 33 and being elastically deformed as described above, the valve body 90 expands not to enter the vent groove 35 (see FIGS. 8 and 9).

Aspects of the above operation will be described in detail in the description of operations and effects of the invention.

As illustrated in FIGS. 4 and 6, an outer wall 40, which has a substantially cylindrical shape and protrudes surrounding the valve seat 30, protrudes at a predetermined height from outward of the outer periphery 31 of the valve seat 30 on the outer surface of the end wall 23.

The outer wall 40 is provided with a plurality of protruding portions 41 protruding from an inner peripheral surface of the outer wall 40 at equal intervals in a circumferential direction. The protruding portions 41 are disposed on a ceiling surface (surface opposite to an inner surface facing the valve seat 30) of the valve body 90, so that the valve body 90 is suppressed from excessively separating from (which can also be said to be excessively opened or floated) the inclined surface 33 of the valve seat 30.

Modifications

Shapes and structures of the cylinder, the piston, the cap, the string-shaped body, and the like constituting the damper device according to the present invention, and shapes and structures of the vent hole, the valve seat, the inclined surface, the vent groove, the outer wall, the protruding portions, and the like constituting the cylinder are not limited to the above-described forms.

In the damper device according to the present embodiment, the piston 60 is pulled by the string-shaped body 80 against the urging force of the coil spring 65 and is movable in the cylinder 20. Alternatively, the piston may be formed integrally with a rod or be coupled to a separate rod.

The wall portion 21 of the cylinder 20 according to the present embodiment has a substantially cylindrical shape. Alternatively, the wall portion of the cylinder may have a substantially thin cylindrical shape having a long axis and a short axis, for example.

In the cylinder 20 according to the present embodiment, the end wall 23 is integrally formed on the other end portion side of the wall portion 21 in the axial direction. Alternatively, for example, the other end portion side of the wall portion of the cylinder may also be opened, to which a separate cap provided with components of the present invention such as the end wall, the vent hole, the valve seat, and the vent groove may be attached.

The inclined surface 33 of the valve seat 30 in the present embodiment is a convex curved surface that is convex in the protruding direction of the valve seat 30. Alternatively, the inclined surface of the valve seat may be, for example, a tapered surface that gradually becomes deeper as approaching straight the vent hole, a concave curved surface that is concave in a direction opposite to the protruding direction of the valve seat (concave curved surface that is concave downward), and even a combination of the convex curved surface, the tapered surface, and the concave curved surface.

The vent groove 35 in the present embodiment includes the first groove 36 and the second groove 38. Alternatively, the vent groove may include at least the first groove and not include the second groove.

In the present embodiment, when the vent hole 25 is viewed from the axial direction as illustrated in FIG. 5, only the first groove 36 constituting the vent groove 35 gradually narrows from the outer peripheral edge portion 33*a* of the inclined surface 33 toward the vent hole 25. Alternatively, the entire vent groove may gradually narrow from a base end to a top end in the extending direction.

In the present embodiment, when the piston 60 moves away from the end wall 23 of the cylinder 20 (when the piston 60 moves in a damper braking direction F1), the damper braking force is applied, and when the piston 60 moves toward the end wall 23 of the cylinder 20 (when the piston 60 moves in a damper return direction F2), the braking force is released.

Alternatively, contrary to the above configuration, the damper braking force may be applied when the piston 60 moves in the direction toward the end wall 23 of the cylinder 20, and the damper braking force may be released when the piston 60 moves in the direction away from the end wall 23 of the cylinder 20.

In the present embodiment, the one member is a fixed body such as an accommodation portion of an instrument panel, and the other member is an openable and closable body such as a glove box or a lid. However, the present invention is not limited thereto as long as the pair of members can approach and separate from each other.

Operations and Effects

Next, operations and effects of the damper device 10 configured as described above will be described.

In the damper device 10, the piston 60 is in a stationary state in the cylinder 20 when the one member (fixed body or the like) and the other member (openable and closable body or the like) are close to each other. In this state, a bottom surface of the valve body 90 abuts against the outer peripheral edge portion 33*a* of the inclined surface 33 of the valve seat 30, and the vent hole 25 is closed except for the vent groove 35.

When the other member moves away from the one member from the above state (when the openable and closable body opens from the fixed body), the piston 60 is pulled via the string-shaped body 80 against the urging force of the coil spring 65 and moves away from the end wall 23 of the cylinder 20, that is, in the damper braking direction indicated by F1 in the cylinder 20.

At this time, pressure in the air chamber defined in the internal space R of the cylinder 20 is reduced, air outside the cylinder 20 is suctioned into the cylinder 20 through the vent groove 35, and a suction force is applied to the bottom surface (surface facing the inclined surface 33 of the valve seat 30) of the valve body 90.

As a result, the bottom surface of the valve body 90 comes into contact with the inclined surface 33 of the valve seat 30, the elastically deformable valve body 90 is elastically deformed along the inclined surface 33 in a manner of expanding outward in the circumferential direction and falling inward in the radial direction of the inclined surface 33, and the contact area with the inclined surface 33 widens. The valve body 90 does not enter the vent groove 35 (see FIGS. 8 and 9) and is closed with respect to the valve seat 30 (the valve body 90 is closed with respect to the inclined surface 33 that can be said to be the seat surface of the valve body 90), and an upper opening (opening on a side opposite to the internal space R of the cylinder 20) of the vent hole 25 is closed.

Accordingly, the damper braking force is applied to the piston 60, and thus the other member can be moved with respect to the one member with a reduced speed (the openable and closable body can be opened from the fixed body with a reduced moving speed). Even when the valve body 90 is closed with respect to the valve seat 30, the damper braking force can be adjusted by circulating air outside the cylinder through the vent groove 35.

FIG. 8 illustrates a case in which the piston 60 moves at a low speed, that is, a case in which an article accommodated in the fixed body has a small weight and a load applied to the openable and closable body is small. FIG. 9 illustrates a case in which the piston 60 moves at a high speed, that is, a case in which an article accommodated in the fixed body has a large weight and a load applied to the openable and closable body is large.

As illustrated in FIG. 8, when the piston 60 moves at a low speed and a small damper braking force is required, the valve body 90 comes into contact with a part of the inclined surface 33 of the valve seat 30 in which the first groove 36 is provided, and is elastically deformed along the inclined surface 33 in a manner of expanding outward in the circumferential direction and falling inward in the radial direction of the inclined surface 33 along a circumferential direction and an inner periphery in a radial direction of a contact target part (contact part with the valve body 90) of the inclined surface 33, and the contact area with the inclined surface 33 widens compared to before the piston 60 moves in the damper braking direction.

The elastic deformation amount of the valve body 90 in this case is smaller than that when the piston 60 moves at a high speed illustrated in FIG. 9.

Since the valve body 90 is elastically deformed and expands along the inclined surface 33 as described above, the valve body 90 is suppressed from entering the first groove 36 (here, the valve body 90 can be substantially reliably suppressed from entering the first groove 36), the second opening 36c of the first groove 36 is maintained in an opened state, and a predetermined range from the base end side to the top end side in the extending direction of the first opening 36b of the first groove 36 is closed. The first opening 38b of the second groove 38 is not closed over the entire range.

On the other hand, as illustrated in FIG. 9, when the piston 60 moves at a high speed and a large damper braking force is required, the valve body 90 comes into contact with a part of the inclined surface 33 of the valve seat 30 in which the first groove 36 and the base end side of the second groove 38 in the extending direction are provided, and is elastically deformed along the inclined surface 33 in a manner of expanding outward in the circumferential direction and falling inward in the radial direction of the inclined surface 33 along the circumferential direction and the inner periphery in the radial direction of the contact target part of the inclined surface 33, and the contact area with the inclined surface 33 widens compared to before the piston 60 moves in the damper braking direction.

In this case, the elastic deformation amount of the valve body 90 (in particular, the deformation amount by which the valve body 90 falls inward in the radial direction) is larger than that when the piston 60 moves at a low speed illustrated in FIG. 8.

Since the valve body 90 is elastically deformed and expands along the inclined surface 33 as described above, the valve body 90 is suppressed from entering the first groove 36 (here, the valve body 90 can be substantially reliably suppressed from entering the first groove 36), the second opening 36c of the first groove 36 is maintained in the opened state, and a range from the base end side of the first opening 36b of the first groove 36 to the base end side of the first opening 38b of the second groove 38 in the extending direction beyond the top end side of the first opening 36b is closed.

That is, a closed amount of the vent groove 35 is larger than that when the piston 60 moves at a low speed illustrated in FIG. 8 (the contact area of the valve body 90 with the inclined surface 33 is larger than that when the piston 60 moves at a low speed).

As described above, when the piston 60 moves in the damper braking direction, the valve body 90 comes into contact with the inclined surface 33, is elastically deformed along the inclined surface 33 in a manner of expanding in the circumferential direction and falling inward in the radial direction of the inclined surface 33, and expands not to enter the vent groove 35. For this reason, there is no room for the valve body 90 to be deformed to enter the first groove 36 when the piston 60 moves in the damper braking direction.

As a result, a vent area of the vent groove 35 gradually narrows from the outer periphery 31 of the valve seat 30 toward the vent hole 25, and thus load responsiveness of the damper device 10 can be improved, and a stable damper braking force can be obtained at an appropriate timing according to the load.

That is, when the load applied to the openable and closable body is small, as illustrated in FIG. 8, a closed amount of the first opening (here, the predetermined range of the first opening 36b of the first groove 36) of the vent groove 35 that is located on the part facing the valve body 90 is smaller than that when the piston 60 moves at a high speed illustrated in FIG. 9. Accordingly, the vent area of the vent groove 35 narrows to be larger than that in the case of FIG. 9, and a stable and small damper braking force according to a small load can be obtained at an appropriate speed and timing.

On the other hand, when the load applied to the openable and closable body is large, as illustrated in FIG. 9, the closed amount of the first opening (here, the entire region of the first opening 36b of the first groove 36 and a part of the first opening 38b of the second groove 38) of the vent groove 35 that is located on the part facing the valve body 90 is larger than that when the piston 60 moves at a low speed illustrated in FIG. 8.

As a result, the vent area of the vent groove 35 is narrowed to be smaller than that in the case of FIG. 8, and a stable and large damper braking force according to a large load can be obtained at an appropriate speed and timing (from a beginning when the openable and closable body opens from the opening of the fixed body).

As described above, in the damper device 10, the elastic deformation amount of the valve body 90 changes in accordance with the load of an article that is applied to the pair of members, that is, cases in which the load applied to the one or the other member is small and large.

That is, the elastic deformation amount of the valve body 90 differs depending on a load of an item or the like, and thus the contact area with the inclined surface 33 is changed according to the load of the item or the like. Accordingly, the vent area of the vent groove 35 can be changed, and thus the load responsiveness of the damper device 10 can be improved. The effects of the damper device 10 can also be described as follows.

That is, during damper braking in the damper device 10, the valve body 90 is elastically deformed and accordingly expands due to the shape of the inclined surface 33 that gradually becomes deeper from the outer periphery of the valve seat toward the vent hole 25, and is thus suppressed from entering the first groove 36 of the vent groove 35. Accordingly, the second opening 36c of the first groove 36 is reliably closed, the vent area of the vent groove 35 is narrowed, and the load responsiveness of the damper device 10 can be improved.

When the other member is moved in a direction approaching the one member (when the openable and closable body is closed to the fixed body), a pulling force from the string-shaped body 80 is not applied to the piston 60, and the piston 60 moves in the damper return direction F2 in the cylinder 20 by the urging force of the coil spring 65.

At this time, air in the air chamber of the cylinder 20 presses the valve body 90 from the inner surface through the vent hole 25, and thus the valve body 90 opens with respect to the valve seat 30. That is, a part of the valve body 90 from an abutment portion against the inclined surface 33 to a radially outer side (the part serves as "a part" of the valve body when the valve body separates from the valve seat) separates to be turned up from the inclined surface 33 of the valve seat 30. Accordingly, air in the air chamber of the cylinder 20 is discharged to outside the cylinder 20 through an upper opening of the outer wall 40 and the like. As a result, the damper braking force applied to the piston 60 is released, and the piston 60 returns to an initial position.

In the present embodiment, the inclined surface 33 of the valve seat 30 is a convex curved surface that is convex in the protruding direction of the valve seat 30.

According to the above aspect, since the inclined surface 33 of the valve seat 30 is a convex curved surface as described above, the valve body 90 can be more easily elastically deformed along the inclined surface 33 when the piston 60 moves in the damper braking direction. As a result, the vent groove 35 can be firmly closed, and the vent area of the vent groove 35 can be more reliably narrowed from the outer periphery of the valve seat toward the vent hole, and accordingly the load responsiveness of the damper device 10 can be further improved.

In the present embodiment, as illustrated in FIG. 5, the first groove 36 extends from the outer periphery of the inclined surface 33 toward the vent hole 25 to be gradually narrower when viewed from the axial direction of the vent hole 25.

According to the above aspect, with the shape of the first groove 36 that extends so that the depth with respect to the inclined surface 33 is gradually narrower from the outer periphery of the inclined surface 33 toward the vent hole 25, as well as the shape of the first groove 36 that extends to be gradually narrower from the outer periphery of the inclined surface 33 toward the vent hole 25 when viewed from the axial direction of the vent hole 25, the vent area of the vent groove 35 can be further easily changed, and the load responsiveness of the damper device 10 can be further improved.

In the present embodiment, the vent groove 35 further includes the second groove 38 that extends from the first groove 36 toward the vent hole 25 such that the depth with respect to the inclined surface 33 is constant.

According to the above aspect, since the vent groove 35 includes the second groove 38 having the above-described configuration, when the piston 60 moves in the damper braking direction and the valve body 90 is elastically deformed along the inclined surface 33, even when the deformation amount of the valve body 90 is large and the entire region of the first opening 36b of the first groove 36 is closed, the first opening 38b of the second groove 38 is less likely to be closed, and the first opening of the vent groove 35 (the entire opening including the first opening 36b of the first groove 36 and the first opening 38b of the second groove 38 and facing the valve body 90) can be suppressed from being completely closed, and thus it is possible to stably generate the damper braking force.

Another Embodiment of Damper Device

Figure 10A:
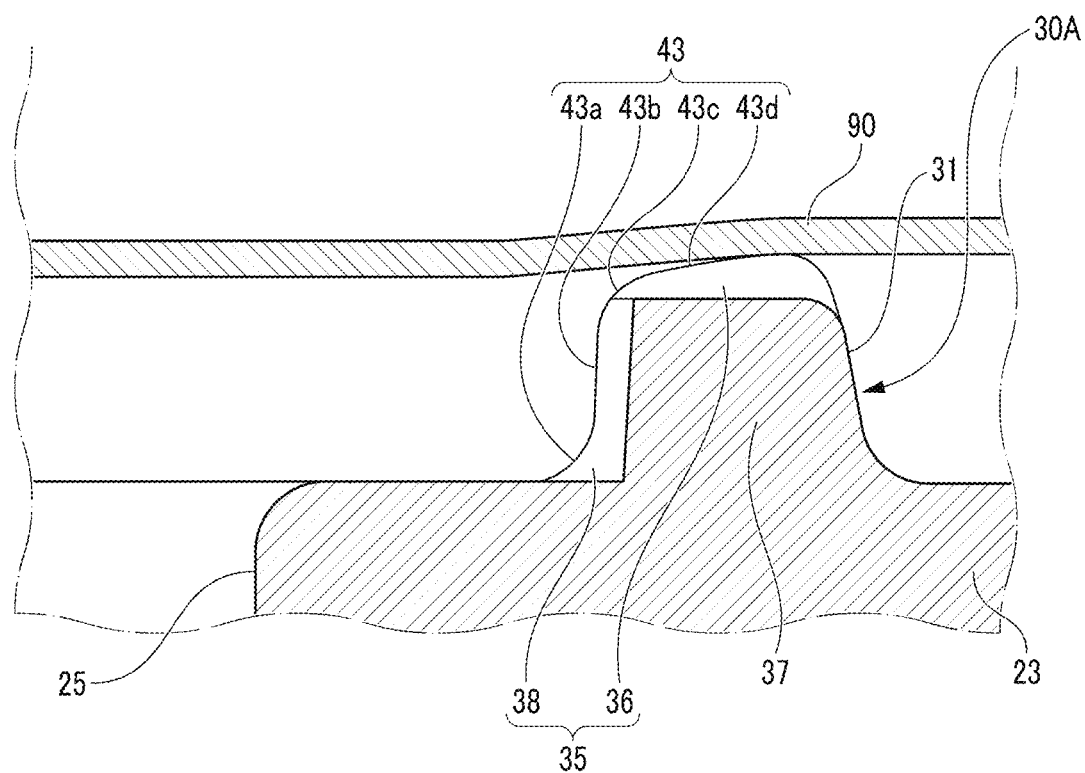
FIG. 10A is an enlarged sectional view of a damper device according to another embodiment of the present invention, illustrating a deformed state of a valve body when a piston moves in a damper braking direction.
Figure 10B:
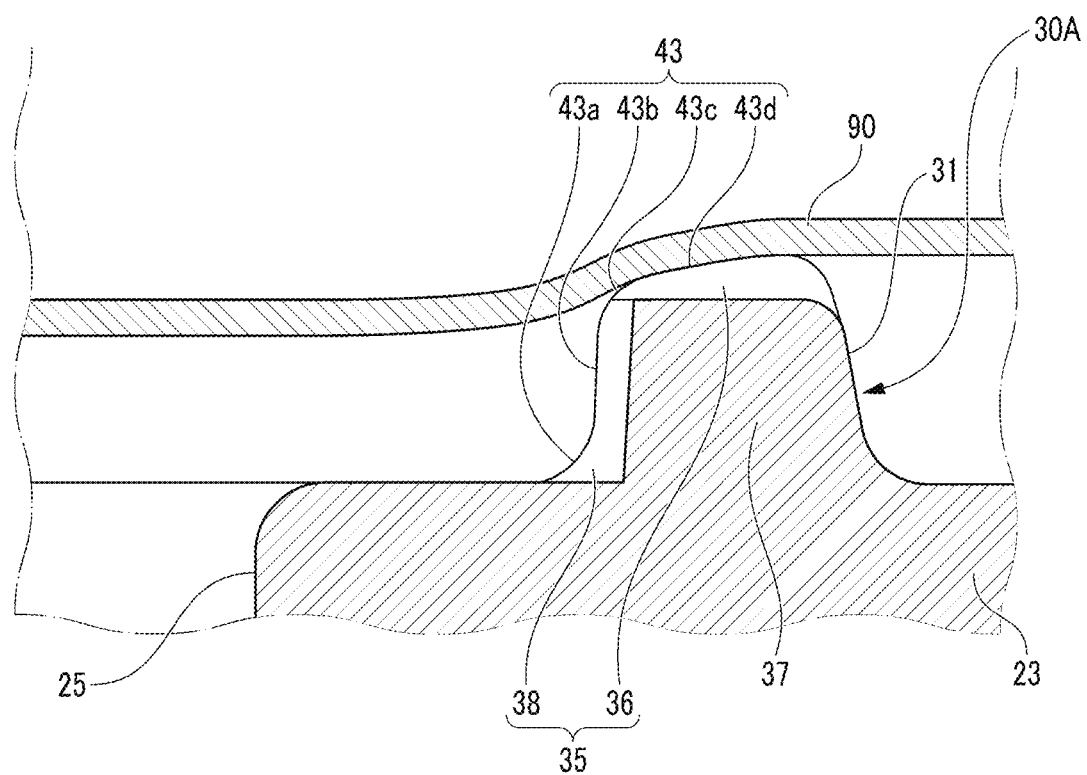
FIG. 10B is an enlarged sectional view of the damper device when a load is larger than a load in FIG. 10A, illustrating the deformed state of the valve body when the piston moves in the damper braking direction.

FIGS. 10A and 10B illustrate a damper device according to another embodiment of the present invention. The same reference signs are given to substantially the same parts as those in the above-described embodiment, and description thereof will be omitted.

The damper device according to the present embodiment is mainly different from that in the above-described embodiment in a shape and a structure of a valve seat 30A.

The valve seat 30A includes a wall portion 37 protruding from the end wall 23 of the cylinder 20. The wall portion 37 has an inner peripheral surface 43b having a vertical surface shape erected along the axial center of the cylinder 20 through a first rounded portion 43a. The inner peripheral surface 43b has a top end coupled to a ceiling surface 43d having a curved surface shape through a second rounded portion 43c.

That is, the ceiling surface 43d, the second rounded portion 43c, the inner peripheral surface 43b, and the first rounded portion 43a are arranged in this order from the outer periphery 31 of the valve seat 30A toward the vent hole 25, and constitute an inclined surface 43 whose protrusion amount gradually decreases from the outer periphery 31 of the valve seat 30A toward the vent hole 25.

The vent groove 35 includes the first groove 36 aligned with the ceiling surface 43d and the second groove 38 aligned with the inner peripheral surface 43b. The second opening 38c of the second groove 38 does not directly reach the vent hole 25 (does not directly communicate with the vent hole 25), but reaches an outer surface of the end wall 23.

As illustrated in FIG. 10A, when the piston 60 moves at a low speed, the valve body 90 comes into contact with a predetermined range of the ceiling surface 43d constituting the inclined surface 43 of the valve seat 30A, and is elastically deformed in a manner of expanding and falling inward in the radial direction along a contact target portion of the ceiling surface 43d.

On the other hand, as illustrated in FIG. 10B, when the piston 60 moves at a high speed, the valve body 90 comes into contact with the ceiling surface 43d and the second rounded portion 43c constituting the inclined surface 43 of the valve seat 30A, and is elastically deformed in a manner of expanding and falling inward in the radial direction along contact target portions of the ceiling surface 43d and the second rounded portion 43c.

As a result, a vent area of the vent groove 35 gradually narrows from the outer periphery 31 of the valve seat 30A toward the vent hole 25, and thus load responsiveness of the damper device can be improved, and a stable damper braking force can be obtained at an appropriate speed and timing according to a load.

Still Another Embodiment of Damper Device

Figure 11A:
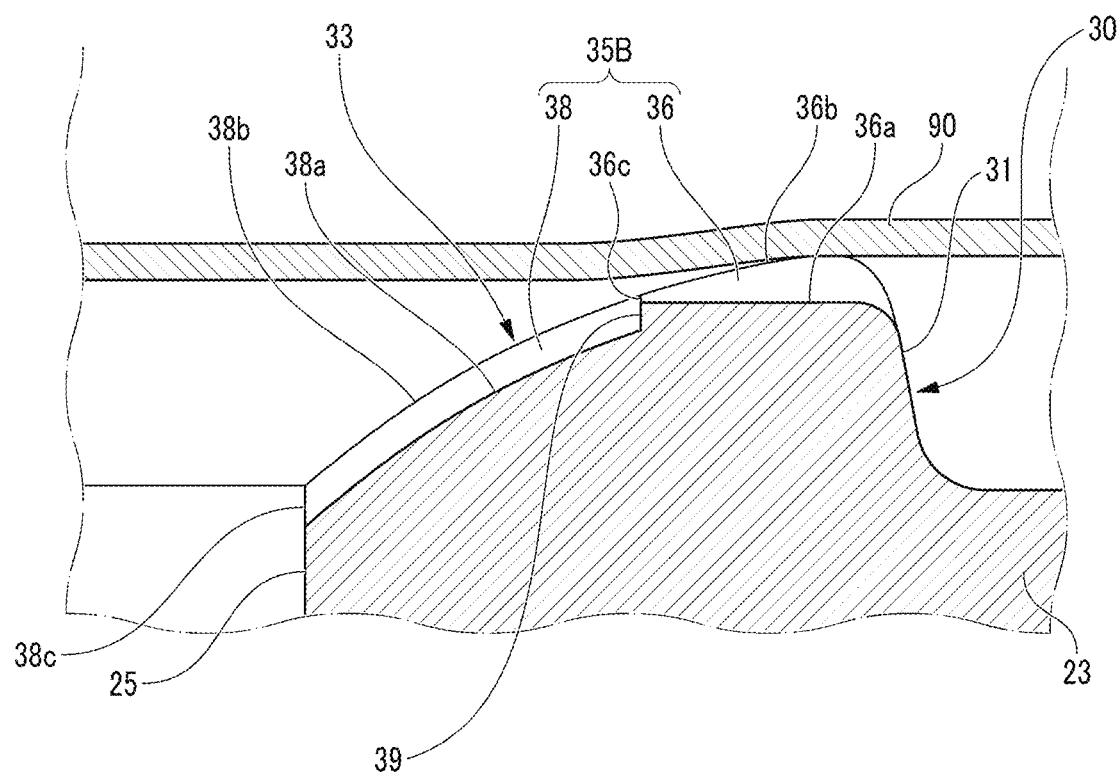
FIG. 11A is an enlarged sectional view of a damper device according to still another embodiment of the present invention, illustrating a deformed state of a valve body when a piston moves in a damper braking direction.
Figure 11B:
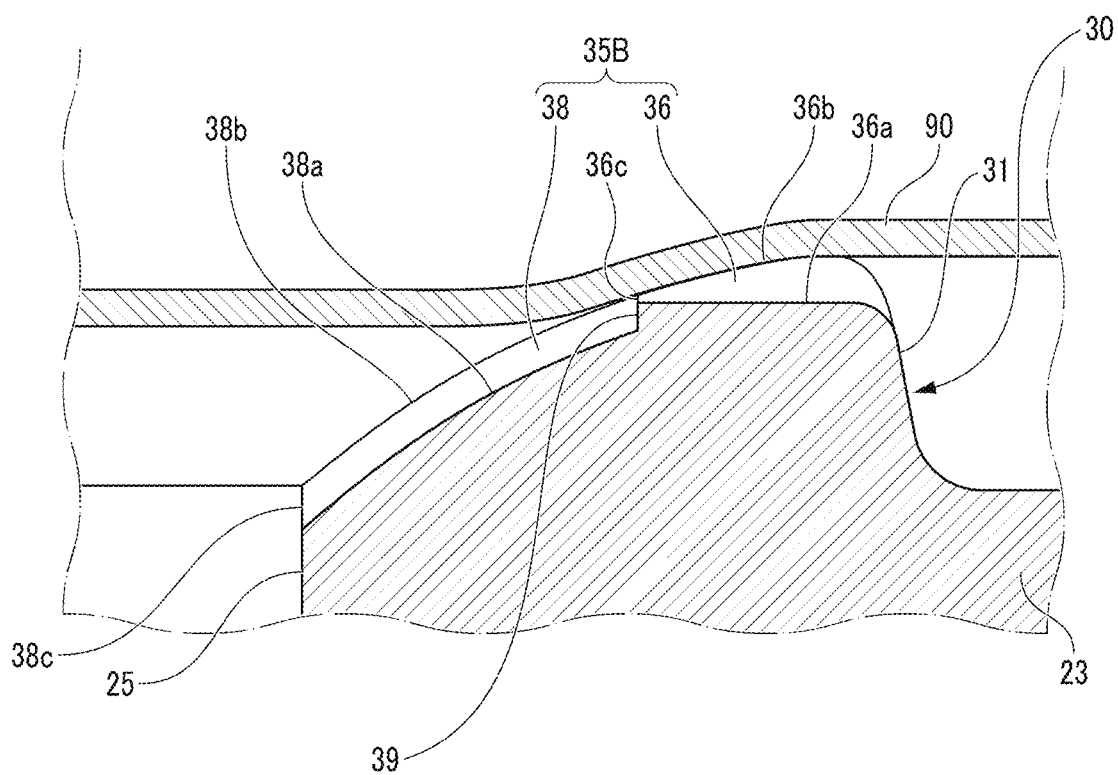
FIG. 11B is an enlarged sectional view of the damper device when a load is larger than a load in FIG. 11A, illustrating the deformed state of the valve body when the piston moves in the damper braking direction.

FIGS. 11A and 11B illustrate a damper device according to still another embodiment of the present invention. The same reference signs are given to substantially the same parts as those in the above-described embodiment, and description thereof will be omitted.

The damper device according to the present embodiment is different from that in the embodiment illustrated in FIGS. 1 to 9 in a shape of a vent groove 35B.

That is, the vent groove 35B in the present embodiment includes the first groove 36 and the second groove 38, and is provided with a step portion 39 having a vertical surface shape along the axial center of the cylinder 20 between the second opening 36c on the top end side of the first groove 36 in the extending direction and the base end side of the second groove 38 in the extending direction.

As illustrated in FIG. 11A, when the piston 60 moves at a low speed, the valve body 90 comes into contact with a part of the inclined surface 33 of the valve seat 30 in which the first groove 36 is provided, and is elastically deformed along the inclined surface 33 in a manner of expanding outward in the circumferential direction and falling inward in the radial direction of the inclined surface 33 along the circumferential direction and the radially inner periphery thereof.

On the other hand, as illustrated in FIG. 11B, when the piston 60 moves at a high speed, the valve body 90 comes into contact with a part of the inclined surface 33 of the valve seat 30 in which the first groove 36 and the base end side of the second groove 38 in the extending direction are provided, and is elastically deformed along the inclined surface 33 in a manner of expanding outward in the circumferential direction and falling inward in the radial direction of the inclined surface 33 along the circumferential direction and the radial direction inner periphery of the inclined surface 33.

As a result, the vent area of the vent groove 35B gradually narrows from the outer periphery 31 of the valve seat 30 toward the vent hole 25, and thus the load responsiveness of the damper device can be improved, and a stable damper braking force can be obtained at an appropriate speed and timing according to a load.

In the present invention, when the piston moves in the damper braking direction, the valve body comes into contact with the inclined surface and is elastically deformed along the inclined surface, and the contact area with respect to the inclined surface widens. For this reason, an elastic deformation amount of the valve body differs depending on a load of an item or the like, and thus the contact area with respect to the inclined surface changes according to the load of the item or the like. Accordingly, the vent area of the vent groove can be changed, and load responsiveness of the damper device can be improved.

The present invention is not limited to the embodiments described above, and various modifications are possible within the scope of the gist of the present invention, and such embodiments are also included in the scope of the present invention.

What is claimed is:

1. A damper device configured to be attached between a pair of members that are configured to approach and separate from each other, and applying a braking force when the pair of members approach or separate from each other, the damper device comprising:
   a cylinder having a cylindrical shape having an internal space, an opening at one end portion, and a vent hole and a valve seat at another end portion, the vent hole communicating with the internal space; and
   a piston configured to reciprocate in the cylinder, wherein
   an elastically deformable valve body is provided at the other end portion of the cylinder and abuts against the valve seat before and when the piston moves in a damper braking direction, and at least a part of the valve body separates from the valve seat when the piston moves in a return direction opposite to the damper braking direction,
   the valve seat surrounds the vent hole and protrudes in a direction opposite to the internal space, and is formed with a vent groove that extends from an outer periphery of the valve seat toward the vent hole and communicates with the vent hole,
   a part of the valve seat that faces the valve body is configured to serve as an inclined surface whose protrusion amount gradually decreases from a side of the outer periphery of the valve seat toward the vent hole,
   the vent groove includes a first groove that extends from an outer periphery of the inclined surface toward the vent hole such that a depth thereof with respect to the inclined surface gradually decreases, and
   when the piston moves in the damper braking direction, the valve body comes into contact with the inclined surface and is elastically deformed along the inclined surface, and a contact area with the inclined surface widens.

2. The damper device according to claim 1, wherein the inclined surface is a convex curved surface that is convex in a protruding direction of the valve seat.

3. The damper device according to claim 1, wherein the first groove extends to be gradually narrower from the outer periphery of the inclined surface toward the vent hole when viewed from an axial direction of the vent hole.

4. The damper device according to claim 1, wherein the vent groove further includes a second groove that extends from the first groove toward the vent hole such that a depth thereof with respect to the inclined surface is constant.

* * * * *